A. H. TYSON.
Limekiln.
No. 1,343.
2 Sheets—Sheet 2.
Patented Sept. 28, 1839.
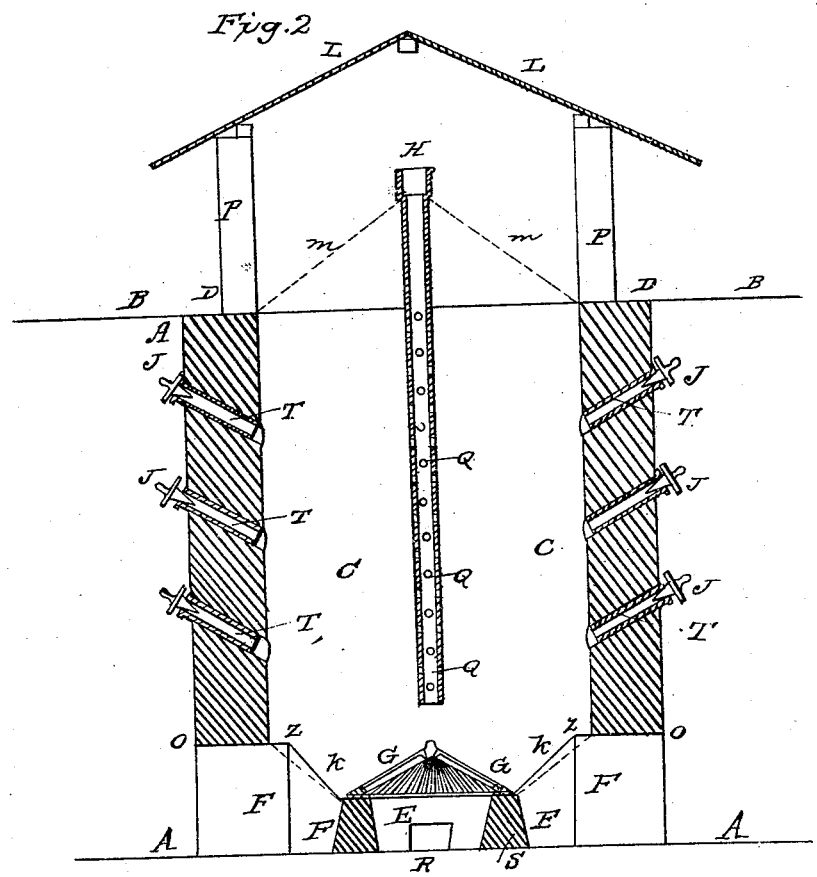
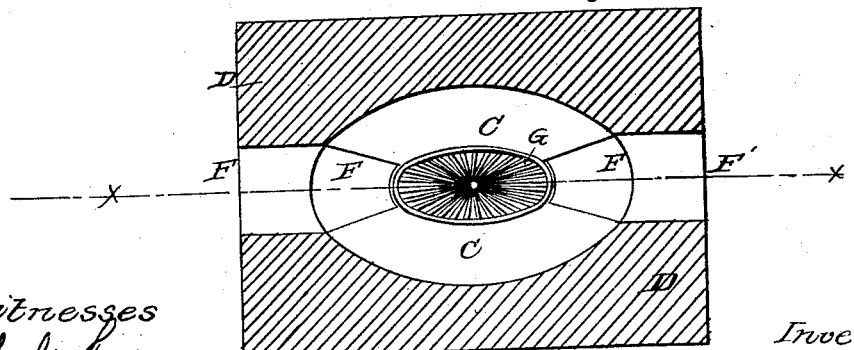
Witnesses
Charles Jones
Beal Marsh
Inventor
A H Tyson

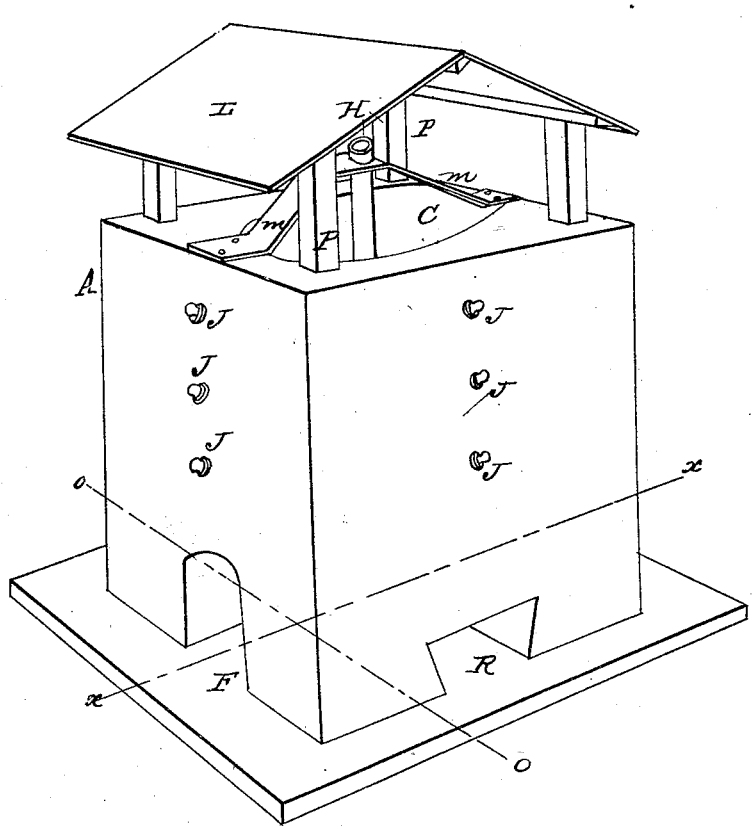

UNITED STATES PATENT OFFICE.

A. H. TYSON, OF BALTIMORE COUNTY, MARYLAND.

LIMEKILN.

Specification of Letters Patent No. 1,343, dated September 28, 1839.

*To all whom it may concern:*

Be it known that I, A. H. TYSON, of Baltimore county, State of Maryland, have invented a new and useful Improvement in the Construction of Kilns for Burning Lime, which is described as follows, reference being had to the annexed drawings of the same, making part of this specification.

Figure 1 is a perspective view. Fig. 2 is a section through the line *x x* of Fig. 1. Fig. 3 is a section through the line *o o* of Fig. 1.

Similar letters refer to similar parts in the figures.

This kiln consists of a regular oval space *c*, formed in a solid body of masonry, open at top and contracted gradually at the bottom from the offsets *z z* which are about three feet above the bottom of the kiln to the top of a smaller body of oval masonry *s* which supports the center grate G under which is a space or ash pit E to receive the ashes and refuse lime which are discharged through a horizontal opening or archway R Figs. 1 and 2, leading from said ash pit to the outside of the kiln. There are other openings F F in the contracted or sloped bottom of the kiln covered by doors K K through which the lime is discharged and then conveyed away through horizontal apertures or archways F′ F′. The center grate is shaped like an inverted oval basket with bars and spaces around its sides. It may however be conical—or elliptical—the bars rising from the base to the vortex in oblique straight line with suitable spaces between them.

A hollow pipe H, open at both ends and perforated at the sides *a*, is suspended over the center of the oval or conical grate G about six inches above it by means of inclined braces *m m* resting on the top of the kiln, or let into the masonry the upper end of said pipe extending about 5 feet above the top of the kiln. This pipe is for increasing the draft in the center of the kiln. In the sides of the kiln are made a number of inclined apertures for increasing the draft and for introducing water to break up the vitrification of the lime stone—said openings or apertures being filled with tubes or pipes T provided with proper stoppers or valves J; these pipes may be called anti clinkering pipes,—because they admit water to prevent the clinkering or vitrification of the lime, for as soon as water comes in contact with the vitrifying substance a pulverization takes place and it descends to the grate through which it passes in a state of refuse lime to the ash pit below, from whence it is removed for agricultural purposes, and the operation of the kiln goes on as before. This effect of water poured on vitrifying lime to break up the vitrification by producing a dissolution of the substance may be proved at any time by trying the experiment. The anti-clinkering pipes serve also to admit rods of iron to ascertain the existence and position of the vitrifying masses and also for regulating the draft of the kiln.

A light roof L may be erected over the kiln supported on posts P resting on top of the kiln.

The greatest diameter of the oval of the kiln should be about 9 feet and the shortest 5 feet. The height should be about 30 feet. The thickness of the walls should be about 4 feet. These dimensions however may be varied at pleasure.

The kiln is charged and lighted in the usual manner. The hollow perforated pipe H increases the draft and promotes combustion at the center in an admirable manner.

It is well known to lime burners that the process of burning is performed most economically when a column of fire is passing from the bottom to the top of the kiln, which can rarely be effected by the kilns now in use. But this object is readily effected through the agency of said pipe H, thereby rendering it a very valuable addition to the lime kiln. The regular oval form of the kiln with parallel sides from the offsets *z* to the top likewise presents great advantages, for it is found by experience that combustion is carried on more regularly in such a formed kiln than in round kilns with sloped sides—the oval kiln burning much faster and more regularly with less fuel and can be discharged of its contents every day in the proportion of one third without the liability of choking at the bottom. The form of the center grate also imparts to this kiln advantages not possessed by others inasmuch as the ashes and refuse lime slide down over all its sides passing through the spaces between the bars very freely and making the drawing of the lime very regular. The introduction of the inclined pipes and stoppers for promoting draft, &c., and for preventing vitrification by the introduction of water is a very valuable improvement.

A kiln constructed on the above principle completely deprives the stone of its carbonic acid gas with one third less fuel than any now in use—with less amount of labor and in a shorter time than in any kiln in use.

What I claim as my invention and desire to secure by Letters Patent is—

1. The introduction of a vertical pipe H in the center of the kiln for increasing the draft as described.

2. Also the introduction of water to prevent the vitrification of the lime by means of the pipes T arranged as above set forth.

3. Constructing the center grate of the form described so as to permit the ashes and refuse lime to slide down its sides and pass between the grate bars into the ash pit below.

4. Lastly I claim the employment of the inclined doors K K for the purpose of discharging the lime, all as herein set forth.

A. H. TYSON.

Witnesses:
THOMAS M. SMITH,
GEO. CAREY.